US008108204B2

(12) United States Patent
Gabrilovich et al.

(10) Patent No.: US 8,108,204 B2
(45) Date of Patent: Jan. 31, 2012

(54) TEXT CATEGORIZATION USING EXTERNAL KNOWLEDGE

(76) Inventors: Evgeniy Gabrilovich, Herzliya (IL); Shaul Markovitch, Haifa (IL)

(*) Notice: Subject to any disclaimer, the term of this patent is extended or adjusted under 35 U.S.C. 154(b) by 677 days.

(21) Appl. No.: 11/457,341

(22) Filed: Jul. 13, 2006

(65) Prior Publication Data
US 2008/0004864 A1    Jan. 3, 2008

Related U.S. Application Data

(63) Continuation-in-part of application No. 11/424,589, filed on Jun. 16, 2006.

(51) Int. Cl.
*G06F 17/27* (2006.01)
*G10L 21/00* (2006.01)

(52) U.S. Cl. .......................... 704/9; 704/275
(58) Field of Classification Search ............... 704/9, 10, 704/252; 707/5, 532
See application file for complete search history.

(56) References Cited

U.S. PATENT DOCUMENTS

| | | | |
|---|---|---|---|
| 5,960,449 A * | 9/1999 | Nagaoka et al. ............. 715/223 |
| 6,006,221 A * | 12/1999 | Liddy et al. .................. 707/5 |
| 7,028,250 B2 * | 4/2006 | Ukrainczyk et al. .......... 715/202 |
| 2002/0022956 A1 | 2/2002 | Ukrainczyk et al. | |
| 2006/0085515 A1 | 4/2006 | Kurts et al. | |
| 2006/0190256 A1 * | 8/2006 | Stephanick et al. .......... 704/252 |

OTHER PUBLICATIONS

"Machine Learning in Automated Text Categorization" by Fabrizio Sebastiani published in ACM Computing Surveys, 34(1):1-47, 2002.
"Feature engineering for a symbolic approach to text classification" by Sam Scott—University of Ottawa, Ontario, Canada in 1998.
"Feature Generation for Text Categorization Using World Knowledge" by Evigeniy Gabrilovich and Shaul Markovit—Proceedings of The 19th International Joint Conference on Artificial Intelligence (IJCAI), pp. 1048-1053, Edinburgh, Scotland, UK, Aug. 2005.
David D. Lewis; "Reuters-21578 text categorization test collection"; Distribution 1.0, README file (v. 1.3), May 14, 2004, (http://david-dlewis.com/resources/testcollections/reuters21578/).
David D. Lewis et al.; "RCV1: A New Benchmark Collection for Text Categorization Research"; Journal of Machine Learning Research 5 (2004), pp. 361-397, (http://www.daviddlewis.com/resources/testcollections/rcv1/).
K. Lang, 20 Newsgroups, "NewsWeeder: Learning to Filter Netnews", ICML '95 USA, School of Computer Science, Carnegie Mellon University, 5000 Forbes Avenue, Pittsburgh, PA, 15213, USA 1995.
Bo Pang and Lillian Lee; "Thumbs up? Sentiment Classification using Machine Learning Techniques"; Proceedings of EMNLP 2002, pp. 79-86, IBM Almaden Research Center, 650 Harry Road, San Jose, CA, 95120, USA.

(Continued)

*Primary Examiner* — David R Hudspeth
*Assistant Examiner* — Farzad Kazeminezhad

(57) ABSTRACT

A method of providing weighted concepts related to a sequence of one or more words, including: providing on a computer an encyclopedia with concepts and a document explaining each concept, forming a vector, which contains the frequency of the word for each concept, for each word in the encyclopedia, arranging the vector according to the frequency of appearance of the word for each concept, selecting the concepts with the highest frequencies for each word from the vector, truncating the rest of the vector, inducing a feature generator using the truncated vectors; wherein the feature generator is adapted to receive as input one or more words and provide a list of weighted concepts, which are most related to the one or more words provided as input.

8 Claims, 5 Drawing Sheets

OTHER PUBLICATIONS

Jenkins et al. Adaptive Automatic Classification on the Web. In Proceedings of the 11th international Workshop on Database and Expert Systems Applications. Sep. 6-8, 2000. pp. 504-511, Sections 1,3, 3.1, 3.2,3.3, 4 and 5.

* cited by examiner

ODP ATTRIBUTE VECTORS

WORD FREQUENCY

WIKIPEDIA ATTRIBUTE VECTORS

CONCEPT FREQUENCY

TEXT CATEGORIZATION USING EXTERNAL KNOWLEDGE

RELATED APPLICATIONS

This application is a continuation in part of a previously filed U.S. patent application Ser. No. 11/424,589 filed on Jun. 16, 2006, and titled "text categorization using external knowledge" the disclosure of which is incorporated herein by reference.

FIELD OF THE INVENTION

The present invention relates generally to computerized categorization of text documents based on the content of the document with the aid of external knowledge.

BACKGROUND OF THE INVENTION

Computerized categorization of text documents has many real world applications. One example is enabling a computer to filter email messages by detecting the messages that are relevant to the categories of interest to the receiver. Another example is news or message routing, wherein a computer can route messages and documents to the recipients that deal with the details relayed in the messages. Other applications are automatic document organization and automatic information retrieval. Search engines can use computerized categorization to parse a query and to find the most related responses.

The standard approach for computerized categorization is to build a classifier engine from a large set of documents that is referred to as a training set. The training set contains a collection of documents that were previously categorized, for example by human reviewers. Typically a set of categories is defined and the reviewers determine which category or categories each document belongs to. The categories may be distinct or may be interconnected, for example the categories may have a hierarchical structure, wherein categories are subdivided to subcategories. An example of such a set is Reuters-21578.

The words in the documents of the training set are analyzed to form a feature vector for each document, which provides the words of the document and their corresponding frequency of use in the document. An induction algorithm is applied to the collection of feature vectors representing all the documents of the training set to produce a categorization engine referred to as a classifier. The classifier's job is to accept as input a document feature vector created for a specific document and provide as output the category or categories with feature vectors having the closest match to the input document vector. Typically, the classifier employs various statistical algorithms such as SVM (support vector machines) or KNN (k nearest neighbors) to determine the closest matching vectors and the required categories.

In a general application a computer is provided with documents as input and is required to determine the category or categories that the document is most related to. The documents are handled by the computer as a bag of words (BOW) without any specific order. The computer analyzes the words appearing in the received documents and produces a document vector representing the content of each document. The document vector is provided to the classifier produced from the training set to determine which category or categories have feature vectors with the closest match to the feature vector of the received document. "Machine Learning in Automated Text Categorization" by Fabrizio Sebastiani published in ACM Computing Surveys, 34(1):1-47, 2002 is an example of a publication which describes computerized categorization as described above.

When comparing categorization results of computerized methods with the optimal categorization results desired, it has been found that the computerized methods have reached a performance barrier due to the lack of world knowledge. Typically a human classifier uses knowledge external to the words in the document to classify the document, for example recognition of the name of a company and what the company deals with, or recognition of the name of a person and the ideas the person presents. Additionally, a human user uses the context and usage of a word to solve problems related to multiple meanings (e.g., polysemy), for example does the word "jaguar" refer to an animal or a car. Similarly, a human user uses external knowledge to handle issues of synonymy, for example to determine that two documents belong to the same category although they use different terminology.

Various attempts have been made to enhance the ability of the bag of words computerized method. Sam Scott in a computer thesis submitted to the University of Ottawa, Ontario, Canada in 1998, titled "Feature engineering for a symbolic approach to text classification" describes the use of "WordNet" (an electronic thesaurus from Princeton University) to add synonymous words and hypernyms to the feature vectors of the input documents and to the feature vectors of the training set documents in order to enhance recognition of words related to the words used to describe a category. In WordNet each word is provided with a list of words that are synonymous or super-ordinate or sub-ordinate to the specific word. It should be noted that some of the words introduced by WordNet may have meanings, which have the context of the document being analyzed and some of the words may be unrelated to the context of the document being analyzed. In the thesis Scott explains that the addition of words from WordNet did not provide the expected improvement in classifying documents with the Reuters data set (e.g., page 86—"why didn't it work?").

SUMMARY OF THE INVENTION

An aspect of an embodiment of the invention relates to a system and method for providing weighted concepts that are related to an input text containing a sequence of one or more words. The concepts are determined by the use of a computerized encyclopedia that comprises concepts and documents explaining the concepts. The computerized encyclopedia provides general knowledge external to the input text that is provided for analysis. The weights determined for each concept provide a measure of the level of relevance of the concept to the input text. The method includes inducing a feature generator from the documents and concepts of the encyclopedia. The feature generator receives as input one or more words and provide a list of weighted concepts most related to the one or more words.

In an exemplary embodiment of the invention, the weighted concepts provide further information about the context of the list of one or more words under consideration from the external knowledge provided by the encyclopedia. Optionally, the provision of the concepts for the list of words can be used to solve word sense disambiguation problems, for example the input text "Jaguar car models" would return concepts related to cars, whereas the phrase "Jaguar Panthera Onca" would return concepts related to animals.

In some embodiments of the invention, the documents of the encyclopedia include links to other documents of the encyclopedia. Optionally, the Wikipedia encyclopedia (www.wikipedia.com/www.wikipedia.org) is used to provide external knowledge for determining the concepts related to the list of words.

An aspect of an embodiment of the invention relates to a system and method for categorizing documents with the aid of an external knowledge database. In an exemplary embodiment of the invention, a training database is prepared by pre-defining categories and categorizing documents according to the pre-defined categories. Additionally, a knowledge database is selected, wherein the knowledge data base comprises a plurality of documents with one or more concepts related to each document. Optionally, at least some of the concepts are represented by multiple documents. In an exemplary embodiment of the invention, a feature generator is induced from the documents of the knowledge database. The feature generator accepts sets of one or more words and determines a level of association of the set of words to each concept. The feature generator is applied to the text of the documents of the training database to provide a generated concept vector, which provides for each document a list of the most related concepts and a weight value indicating the level by which the concept is related to the document. Additionally, for each document a feature vector is calculated, which provides the words in the document and their related frequencies. For each document the feature vectors are combined with the generated concept vectors to form an enhanced feature vector. An induction algorithm is applied to the enhanced feature vectors to generate a classifier. The classifier accepts as input feature vectors representing provided documents and produces a weighted list of categories related to the provided documents. In some embodiments of the invention, the classifier also produces a list of documents from the training database, which are most related to the provided document. In an exemplary embodiment of the invention, a category is determined from the produced list of documents.

In some embodiments of the invention, the concepts of the knowledge database are interrelated, for example by using links that point from one document to another. Optionally, the concepts form a hierarchical structure.

In some embodiments of the invention, the input text provided to the feature generator comprises each word in the document as a separate set. Alternatively or additionally, the input text comprises the words of each sentence of the document as a separate set. Alternatively or additionally, the input text comprises the words of each paragraph of the document as a separate set. Further alternatively or additionally, the input text comprises a single set with all the words of the document together.

An aspect of an additional embodiment of the invention relates to a system and method of searching through the contents of a database of documents for documents related to the content of a given document with the aid of an external knowledge database.

There is thus provided in accordance to an exemplary embodiment of the invention, a method of providing weighted concepts related to a sequence of one or more words, comprising, providing on a computer an encyclopedia with concepts and a document explaining each concept, forming a vector, for each word in the encyclopedia, which contains the frequency of the word for each concept, arranging the vector according to the frequency of appearance of the word for each concept, selecting the concepts with the highest frequencies for each word from the vector, truncating the rest of the vector, inducing a feature generator using the truncated vectors; wherein the feature generator is adapted to receive as input one or more words and provide a list of weighted concepts, which are most related to the one or more words provided as input.

In an exemplary embodiment of the invention, the selecting selects the concepts with the highest frequencies which are higher by a pre-selected percentage than any other frequency in the vector. Optionally, the pre-selected percentage is greater than 10%. Alternatively the pre-selected percentage is greater than 20%. In an exemplary embodiment of the invention, the documents include links to other documents of the encyclopedia. Optionally, the encyclopedia is the Wikipedia encyclopedia. In an exemplary embodiment of the invention, the method further comprises resolving word sense disambiguation by generating related concepts for various sequences of words from a document. Optionally, the method is used for automatic assessment of semantic similarity of multiple texts.

In an exemplary embodiment of the invention, the method further comprises mapping the concepts of the encyclopedia to the concepts of a hierarchical structured knowledge database, and adding the sub-ordinate or super-ordinate concepts from the hierarchical structured knowledge database for each weighted concept provided by the feature generator.

There is additionally provided according to an exemplary embodiment of the invention, a system for providing weighted concepts related to a sequence of one or more words, comprising, a computer, an encyclopedia with concepts and a document explaining each concept, wherein the computer is adapted to form a vector, which contains the frequency of the word for each concept, for each word in the encyclopedia, arrange the vector according to the frequency of appearance of the word for each concept, select the concepts with the highest frequencies for each word from the vector, truncate the rest of the vector, induce a feature generator using the truncated vectors; wherein said feature generator is adapted to receive as input one or more words and provide a list of weighted concepts, which are most related to the one or more words provided as input.

BRIEF DESCRIPTION OF THE DRAWINGS

The present invention will be understood and appreciated more fully from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
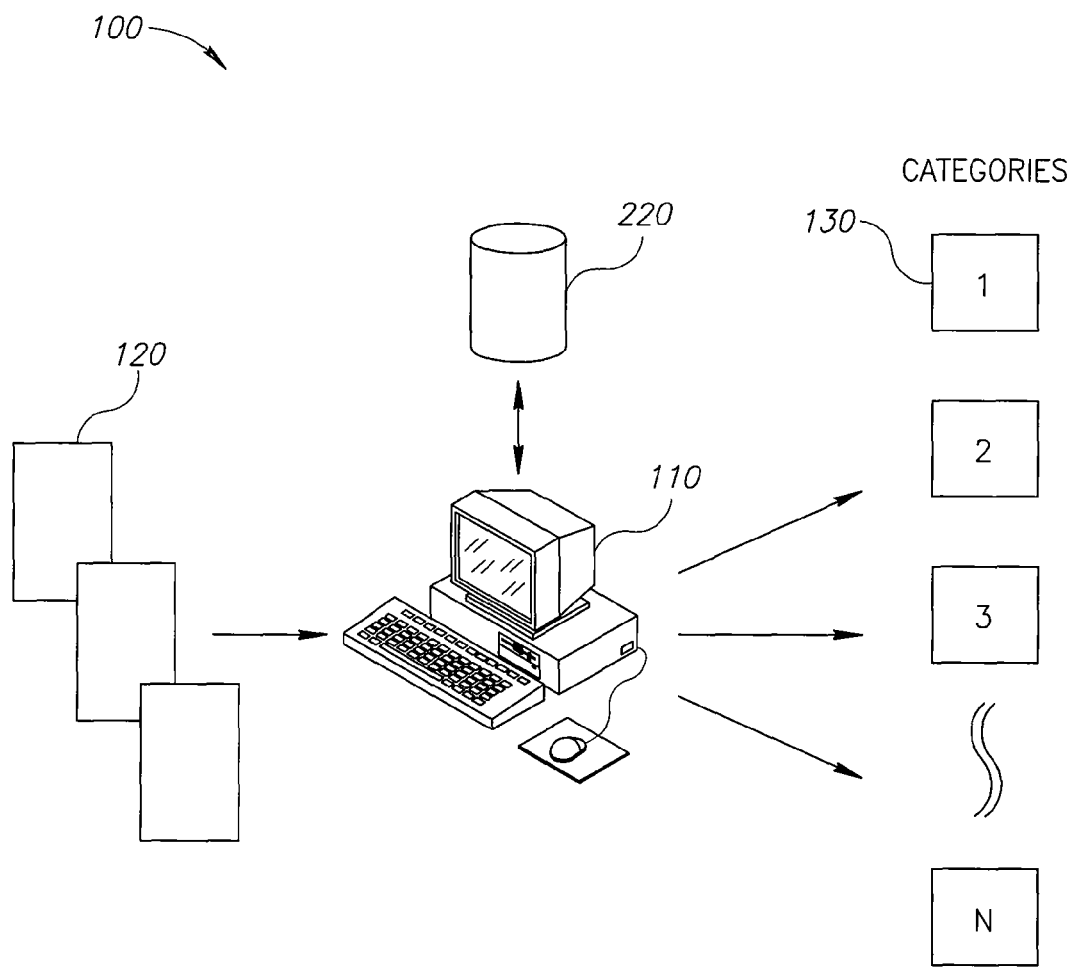
FIG. 1 is a schematic illustration of the implementation of an enhanced computerized categorization system, according to an exemplary embodiment of the invention.

FIG. 1 is a schematic illustration of the implementation of an enhanced computerized categorization system 100, according to an exemplary embodiment of the invention. In an exemplary embodiment of the invention, system 100 comprises a general purpose computer 110 for example a personal computer or any other computing device which can process data. Optionally, computer 110 is provided with documents 120 as input, and is required to provide as output a determination regarding one or more categories 130 which the document relates to. In an exemplary embodiment of the invention, computer 110 analyzes the words appearing in the document and is aided by an external knowledge database 220 to provide the determination.

Figure 2:
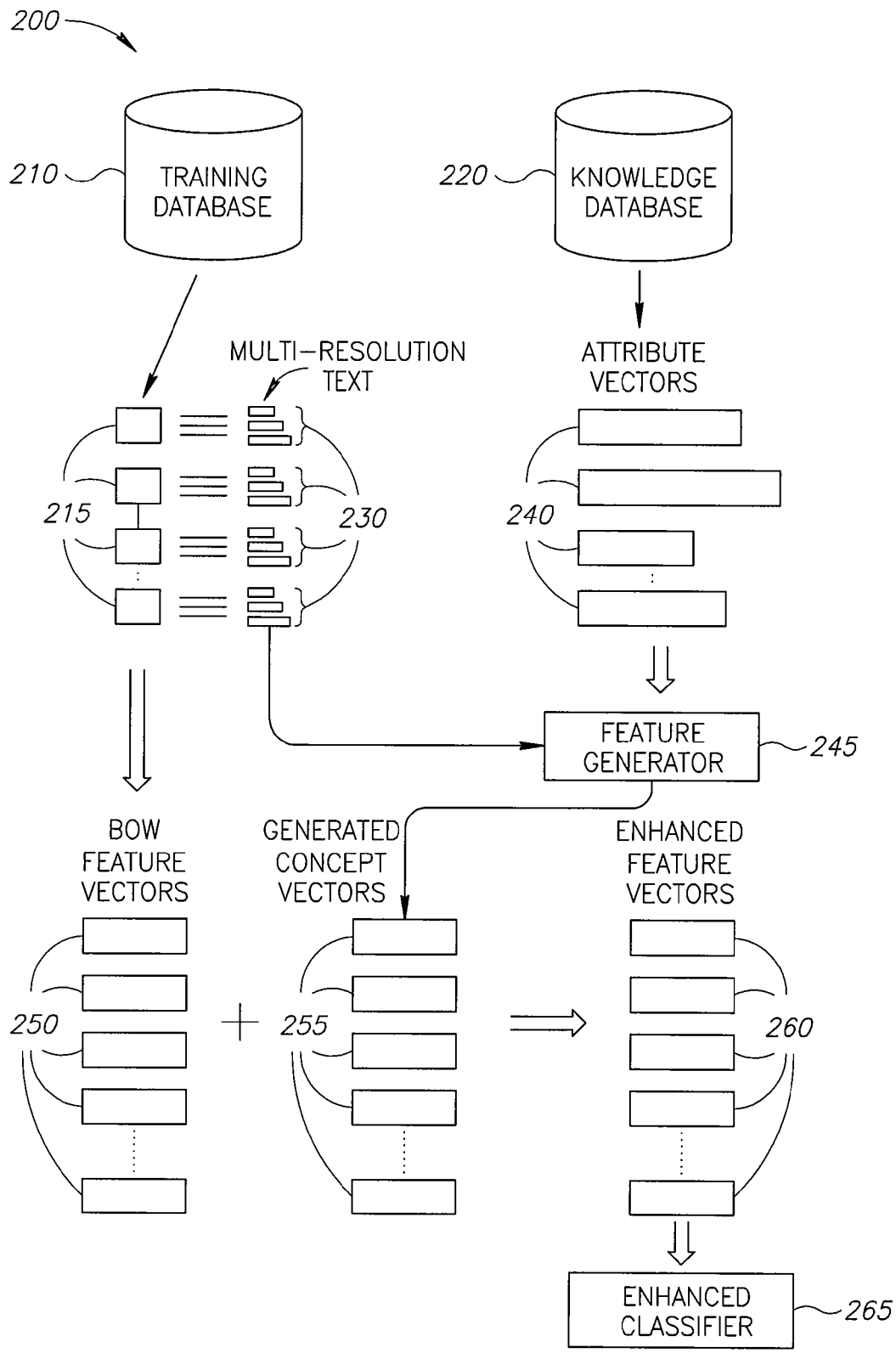
FIG. 2 is a schematic illustration of a database system for enhancing a category classifier, according to an exemplary embodiment of the invention.
Figure 3:
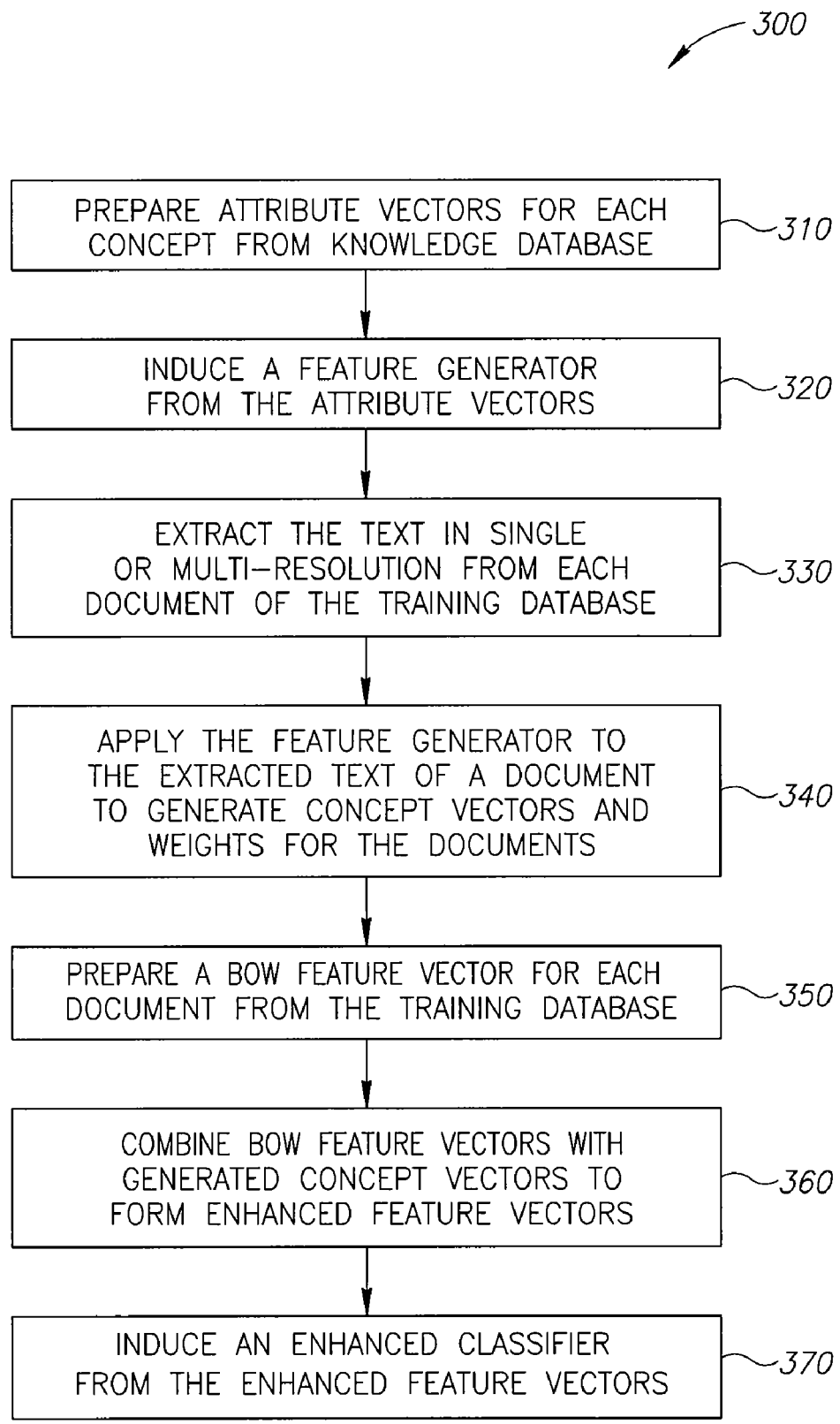
FIG. 3 is a flow diagram illustrating a process of preparing an enhanced category classifier with external knowledge, according to an exemplary embodiment of the invention.

FIG. 2 is a schematic illustration of a database system 200 for enhancing a category classifier, according to an exemplary embodiment of the invention. FIG. 3 is a flow diagram 300 illustrating a process of enhancing a category classifier with external knowledge, according to an exemplary embodiment of the invention. In an exemplary embodiment of the invention, a categorized training database 210 is created or selected from an existing source to be used to induce an enhanced classifier for categorizing documents. Optionally, training database 210 comprises a collection of documents 215 which have been previously reviewed and cataloged according to a list of pre-defined categories. In some embodiments of the invention, a user may define categories of interest and create a training set database by sorting a given collection of documents according to the defined categories. Examples of databases which have been previously prepared and used as training databases in various research projects and implemented in testing various embodiments of the invention, are:

1. Reuters-21578—(http://daviddlewis.com/resources/testcollections/reuters21578/) with about 10,000 documents in about 100 categories and about 2.8 million words.
2. Reuters Corpus Volume I (RCV1)—(http://www.daviddlewis.com/resources/testcollections/rcv1/) which has more than 800,000 documents divided to a few hundred categories (400-500) and about 196 million words.
3. 20 Newsgroups—(K. Lang. Newsweeder: learning to filter netnews. In ICML'95, pages 331-339, 1995) which has 20 categories with 1000 documents each and about 5.5 million words altogether.
4. Movie Reviews—(B. Pang, L. Lee, and S. Vaithyanathan. Thumbs up? Sentiment classification using machine learning techniques. In EMNLP'02, 2002) which has a dataset of 1400 documents of movie reviews that are divided into 2 groups: positive reviews and negative reviews, with about 1 million words.

In an exemplary embodiment of the invention, knowledge database 220 is selected to serve as an external knowledge source. Optionally, knowledge database 220 comprises a collection of documents, wherein each document is designated to relate to one or more concepts. In some embodiments of the invention, the concepts may be interrelated, for example forming a hierarchical structure. Alternatively, the concepts may be independent (e.g. provided without any given relation between the concepts). Optionally, computer 110 analyzes the words from the documents of knowledge database 220 to prepare (310) a set of attribute vectors 240 for each concept. Documents associated to a concept serve as a positive example for the relevance of the words appearing in the document to the concept. In contrast documents not associated to a concept serve as negative examples. Optionally, in a hierarchical structured knowledge database the concepts subordinate or super-ordinate to a concept are incorporated when providing the concept.

In an exemplary embodiment of the invention, an attribute vector is used to represent the words appearing in the documents related to the concepts and their frequency of appearance. Optionally, a feature generator 245 (e.g. a centroid based classifier) is induced (320) from the collection of attribute vectors. Feature generator 245 is used to accept words or sets of words and determine a list of concepts and weights for each concept relative to the specific word or set of words, for example for a specific word the feature generator provides the concepts for which the word is listed to appear in their attribute vectors with the highest frequency. In some embodiments of the invention, other text classification methods can be used to induce feature generator 245, for example SVM, KNN and decision trees). Optionally, for a set of words the feature generator calculates for each concept the combined frequency of appearance for all the words. Thus for a set of words associated to a single concept the concept will have a greater weight than for a set of words not related to the single concept. In some embodiments of the invention, feature generator 245 provides a limited number of concepts and weights, for example the 1000 concepts with the highest weights. Alternatively, feature generator 245 may provide more than 1000 concepts or less. Optionally, feature generator 245 may use a threshold value to cut off less relevant concepts based on their associated weights, and provide a variable number of concepts for each generated concept vector 255.

In an exemplary embodiment of the invention, the text of each document 215 of training database 210 is parsed into a list of terms 230 to be used to apply feature generator 245 on each member of the list. In some embodiments of the invention, list of terms 230 comprises the words of the document 215. Alternatively, list of terms 230 may comprise a multi-resolution list from document 215, for example a sub list with all the words, a sub list with all the words grouped into sets of words of a pre-set window size, a sub list with all the words grouped into sets of words comprising the words from each sentence, paragraph and/or document. In an exemplary embodiment of the invention, for a single document, feature generator 245 may be applied to each word of the document, to the words of each sentence of the document as a set of words, to the words of each paragraph of the document as a set of words, and to the words of the entire document as a single set of words. In an exemplary embodiment of the invention, the resulting concepts and weights from applying (340) feature generator 245 on list of terms 230 of document 215 are combined to a generated concept vector 255 providing the most relevant concepts to the document.

In some embodiments of the invention, other statistical methods known in the art may be used to produce feature generator 245 from knowledge database 220, for accepting text objects (e.g. list of terms 230) and providing generated concept vector 255 with the most relevant concepts.

In an exemplary embodiment of the invention, documents 215 are analyzed to prepare (350) a feature vector 250 for each document 215 from training database 210, which is based on the bag of words approach. Optionally, feature vector 250 provides the words of document 215 or database 210, and the frequency of appearance in document 215 of each word. In an exemplary embodiment of the invention, feature vector 250 of document 215 and generated concept vector 255 of document 215 are combined (360) to form an enhanced feature vector 260 for document 215. Enhanced feature vector 260 provides for each document 215 a feature vector, which is enhanced by concepts that are related to the content of the document from external knowledge database 220.

In an exemplary embodiment of the invention, an enhanced classifier 265 is induced (370) from enhanced feature vectors 260, for example using an induction algorithm such as SVM or KNN. Optionally, enhanced classifier 265 will accept as input feature vectors representing a document as explained above. Optionally, enhanced classifier 265 determines which documents represented by enhanced feature vectors 260 are most representative of the document. Optionally, since each document 215 is defined as belonging to a specific category, the most related categories are determined from the results of the enhanced classifier. In some embodiments of the invention, enhanced classifier 265 provides a categorization determination directly without providing a determination of the most related documents.

In some embodiments of the invention, feature vectors 250 of the input document are enhanced with external knowledge from knowledge database 220 as will be described below in conjunction with FIG. 4.

In an exemplary embodiment of the invention, the use of a large knowledge database 220 and/or a less large knowledge database 220 that is conceptually related to the categories of training database 210, provides general knowledge, which improves the accuracy of analysis of documents 120. Examples of databases which have been considered and/or used to experiment implementation of an enhanced classifier according to exemplary embodiments of the invention include:

1. Open Directory Project (ODP)—(www.dmoz.com) this collection provides the work of over 70,000 human editors that have reviewed and cataloged over 5,000,000 web sites into close to 600,000 categories.
2. Yahoo!—(www.yahoo.com).
3. Medical Subject Headings (MeSH)—(http://www.nlm.nih.gov/mesh/meshhome.html) for analyzing documents related to medical categories.
4. Wikipedia encyclopedia—(http://www.wikipedia.org/).

Each of the above databases provides reference to a large amount of documents (e.g. HTML documents or similar variants). In an exemplary embodiment of the invention, the ODP catalog was downloaded to provide a list of concepts and links to documents related to the concepts. Each link points to a body of text and optionally, points to other links. In an exemplary embodiment of the invention, the collecting process was limited to English material leaving a collection of about 400,000 concepts with links to approximately 2,800,000 URL's. Collecting the text pointed to by the URL's provided a collection of approximately 436 MB of text. By crawling the URL's and taking about 10 additional pages for each URL, assuming that the URL's referenced in a web page usually are related to the referencing web page, a collection of 425 GB of text HTML files was collected. In order to enhance applicability further limitations were applied, for example limiting maximum file sizes to 50 KB, removing words that don't provide information (e.g. of, to, and) and removing rare/meaningless/erroneous words (e.g. words appearing in less than 5 documents). Altogether, a collection of 20,700,000 distinct terms (e.g. words or phrases) were achieved to represent a subset of 63,000 ODP concepts from the concepts mentioned above. Optionally, analysis of the word frequencies in the document collection can be performed in single resolution or in multiple resolutions as explained above. Optionally, analysis in multiple resolutions provides a maximized indication of the words and/or groups of words which best represent a specific concept. In an exemplary embodiment of the invention, the analysis using frequency and statistical methods as described above selected up to 1000 of the most informative terms for each concept.

In an exemplary embodiment of the invention, enhanced feature generator 245, enhanced classifier 265, training database 210 and knowledge database 220 are connected to and/or implemented by computer 110 using any suitable computer hardware and computer programming language as known in the art. Alternatively, a dedicated computational device or specially designed integrated circuit can be used to implement the methods described above.

Figure 4:
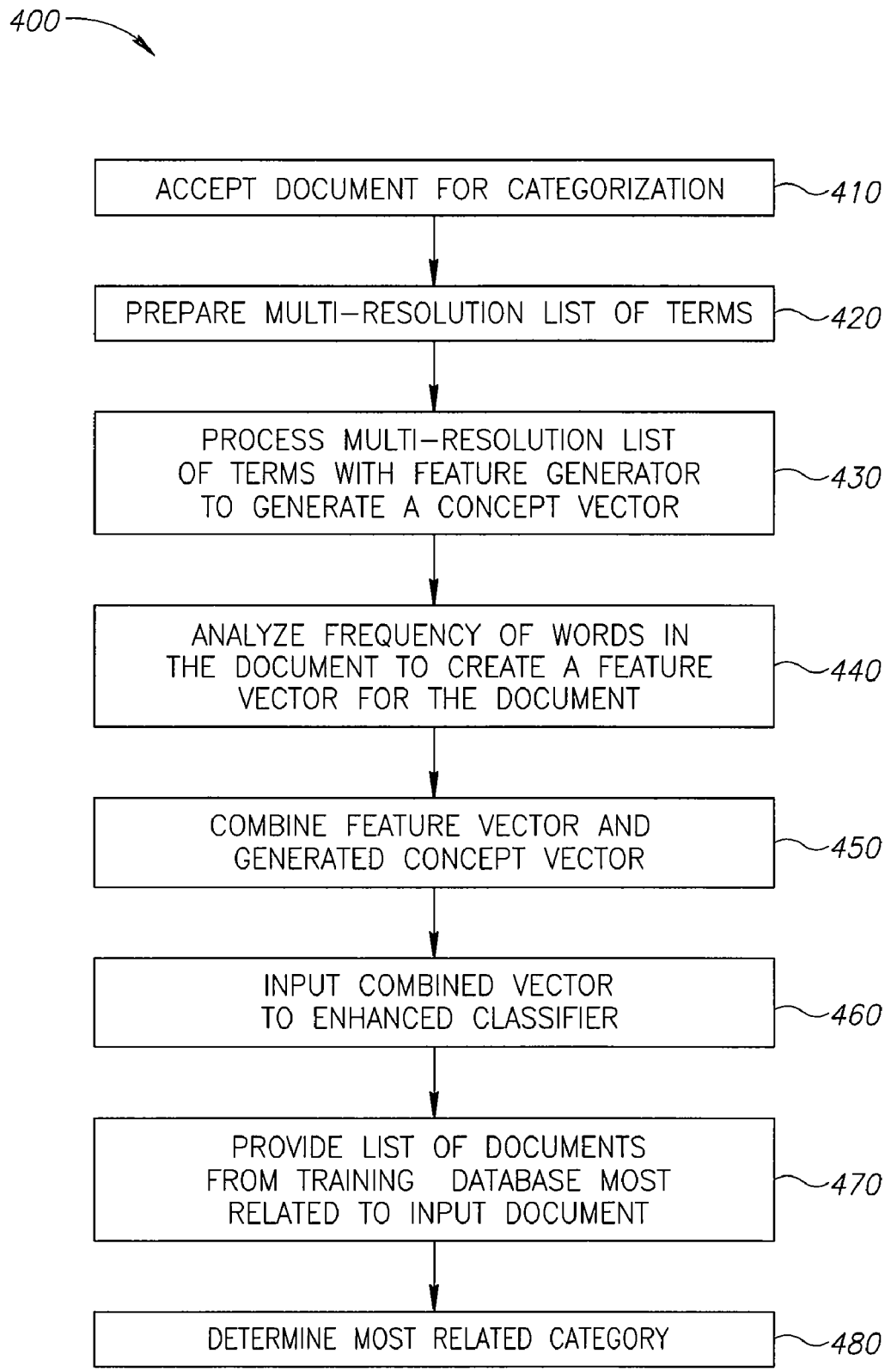
FIG. 4 is a flow diagram illustrating a process of categorizing a document using an enhanced classifier, according to an exemplary embodiment of the invention.

FIG. 4 is a flow diagram 400 illustrating a process of categorizing a document using an enhanced classifier, according to an exemplary embodiment of the invention. In an exemplary embodiment of the invention, computer 110 accepts (410) a document 120 for categorization. In some embodiments of the invention, computer 110 prepares (420) a multi-resolution list of terms from the text of the document as described above. Optionally, computer 110 processes (430) the multi-resolution list of words with feature generator 245 to generate a concept vector 255 with a list of concepts and their respective weights related to document 120. In an exemplary embodiment of the invention, computer 110 analyzes (440) the frequency of the words in document 120 to provide a feature vector 250 for document 120. Optionally, computer 110 combines (450) feature vector 250 with generated concept vector 255 to provide enhanced feature vector 260 representing document 120. In an exemplary embodiment of the invention, enhanced feature vector 260 is input (460) to enhanced classifier 265 for processing. Optionally, enhanced classifier 265 provides (470) a list of documents from training database 210 that are most related to document 120 and a weight value indicating a level of association. In an exemplary embodiment of the invention, the most related categories are determined (480) from the weighted list of documents provided.

In an exemplary embodiment of the invention, the above method can be used to enhance search results by performing a search with the addition of concepts from knowledge database 220. In an exemplary embodiment of the invention, to perform a web search such as provided by Google® or Msn® the training database would be the backed up pages of the Internet, which are pre-categorized for example by the process described above. Optionally, a search may be provided as a list of words, for example the words the user can think of as related to what is being searched for, one or more sentences or paragraphs describing the search, or even a whole document about the search. In an exemplary embodiment of the invention, the document or list of words can be processed as described above to provide a list of documents most related to the provided search data. The list of documents resulting from enhanced classifier 265 constitutes the results of the search, without requiring a determination of the related categories. Optionally, searching with the use of external knowledge can provide more accurate results without actually knowing the exact terms used by the documents found.

In some embodiments of the invention, word sense disambiguation can be achieved using the above methods. Optionally, in a document with a polysemous word, analysis of the document can provide the concepts most related to the document thus resolving the context of the word. In an exemplary embodiment of the invention, the document is broken up to a list of terms in the document. The list of terms in the document is provided as input to feature generator 245. Feature generator 245 provides generated concept vector 255 with the concepts most related to the document with the polysemous word. The most related concepts are used to determine, which meaning the word is referring to in the context of the document. As an example consider the word bank, which could refer to a financial institution or to sloping land (e.g. the sides of a river). Optionally, by analyzing the document with feature generator 245 and receiving that the most related concepts are money, economics, savings, checks and cash, it is easy to determine that the first meaning was intended.

Generally, in prior art systems a large selection of documents in training database 210 is required to achieve reasonable results in automatic categorization of documents. Optionally, by introducing the external knowledge provided by knowledge database 220 as described above a user can construct a categorized training database with fewer documents initially categorized while maintaining accuracy of the resulting document categorization process. As a result less human effort is required to initialize an automatic categorization system.

In some embodiments of the invention, knowledge database 220 is selected to comprise a set of documents with at least a hundred megabyte of text or at least a gigabyte of text in order to provide enough variety to receive meaningful results. Optionally, knowledge database 220 comprises more than 1,000 concepts or more than 10,000 concepts to provide effective results. Optionally, a larger knowledge database 220 provides more accurate results and can compensate for a small training database.

In some embodiments of the invention, knowledge database 220 specializes in a specific field of knowledge, for example MeSH (mentioned above) specializes in medicine. Other exemplary knowledge databases specialize in economics or military related topics. Optionally, a knowledge database 220 that specializes in a specific field is more appropriate for use when categories 130 are related to the specific field, which the knowledge database specializes in.

In an exemplary embodiment of the invention, knowledge database 220 may be represented by an Internet encyclopedia such as the Wikipedia encyclopedia as mentioned above. The Wikipedia encyclopedia currently contains more than 1.2 million entries in the English language. In an exemplary embodiment of the invention, the current analysis is limited to dealing with a single language (English), however it should be noted that the method described herein is applicable to other languages as well. Optionally, in the Wikipedia encyclopedia each entry can be viewed as representing a concept. However in contrast to ODP wherein multiple documents were related to each concept, in the Wikipedia encyclopedia each concept is represented by a single document. Optionally, one would think that a single document for each concept, is not as rich in content (e.g. words, names, phrases) and in its ability to provide statistical information regarding the importance of the content in relation to the concept, as the multiple documents of the ODP. However, by implementing a different approach in analyzing the content, the Wikipedia encyclopedia can serve as a rich source of content similar to ODP, due to the concentrated relevance of its content, in contrast to the less focused average document in the ODP. In an exemplary embodiment of the invention, when using the Wikipedia encyclopedia the attribute vectors 240 are formed by a different process than that used for ODP.

In an exemplary embodiment of the invention, before creating the feature vectors the encyclopedia is analyzed to remove articles which do not provide important information, for example articles which are very short (e.g. with less than 10-20 words), articles with very few links to other articles, (e.g. less than five links), or articles, which very few articles link to (e.g. less than 5 other articles refer to the article).

Figure 5:
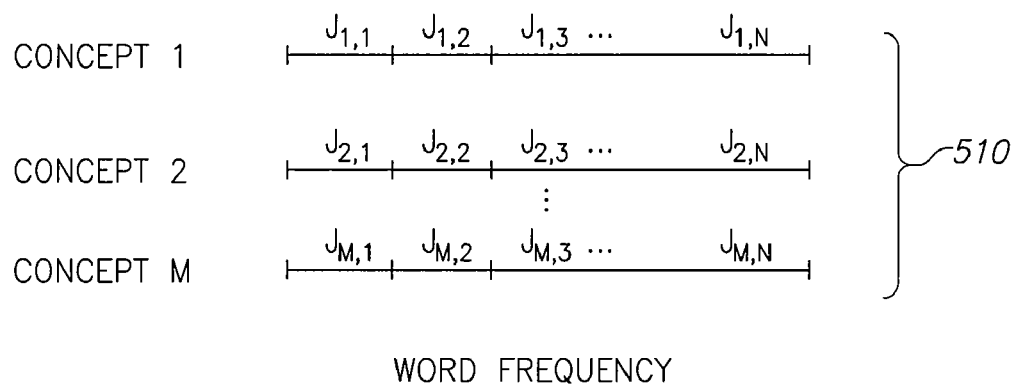
FIG. 5 is an illustration depicting two types of attribute vectors for constructing a feature generator, according to an exemplary embodiment of the invention.
Figure 5:
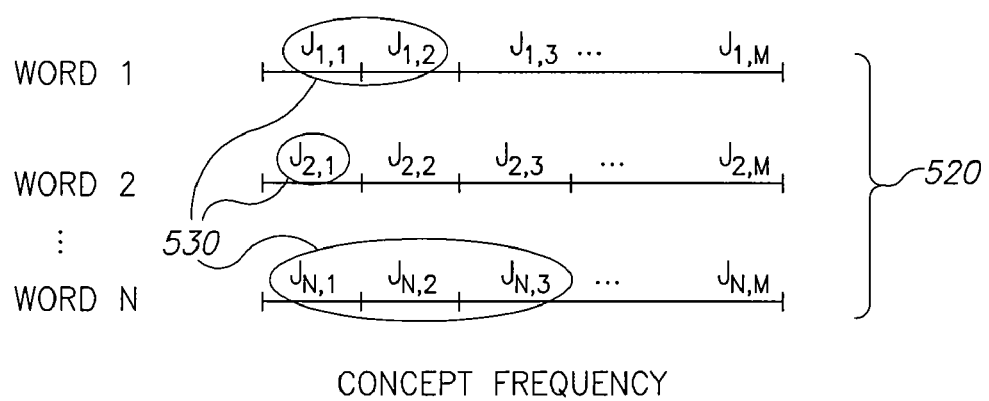

FIG. 5 is an illustration depicting two types of attribute vectors for constructing feature generator 245, according to an exemplary embodiment of the invention. In some embodiments of the invention, such as when the ODP is used as knowledge database 220 attribute vectors 240 are created by forming attribute vectors 510. Optionally, for each concept an attribute vector 510 is created, wherein each attribute vector provides for each word in the documents of the concept, the frequency of appearance ($J_{l,k}$ wherein l=no. of concept, k=no. of word) of the word. In some embodiments of the invention, attribute vectors 510 are all the same size, for example by representing all the words in the ODP in each vector and providing zeros for words that do not appear for a specific concept. Alternatively, each attribute vector may be a different size depending on the number of words appearing for each concept.

In an exemplary embodiment of the invention, when using the Wikipedia encyclopedia for knowledge database 220, attribute vectors 520 with the indexes inverted relative to those created for dealing with the ODP, are prepared to produce attribute vectors 240. In an exemplary embodiment of the invention, attribute vector 520 provides for each word from the entire encyclopedia the frequency with which it appears for all concepts. Optionally, each attribute vector 520 is then arranged by the magnitude of the frequencies. The concepts with the highest frequency magnitude are selected as representing the most relevant concepts 530 for the specific word. In an exemplary embodiment of the invention, the most relevant concepts 530 are those concepts with the highest frequency values relative to the rest of the concepts, for example selecting the concepts until a drop of more than a pre-selected percentage (e.g. 10%, 20%) appears in the frequency magnitude. As an example consider for a specific word that appears for the first 11 concepts in the sorted inverted attribute vector 520 with a frequency magnitude of between 95-105 times and the proceeding concepts only record a magnitude of 85 times and less, it is assumed that the first 11 concepts (before the drop) are most related to the word and the rest of the concepts are less significant In some embodiments of the invention, a pre-selected number of concepts may be selected, for example 10, 100 or 1000 concepts.

Optionally, once the attribute vectors 240 are established feature generator 245 can be constructed. In an exemplary embodiment of the invention, feature generator 245 is used to accept input text from a new document and provide concepts with weights related to the concepts, which are most related to the words or the group of words. Optionally, the concepts can then be added to feature vectors formed for the new document to enhance the words of the document with external knowledge as described above.

In an exemplary embodiment of the invention, the documents of the encyclopedia are provided as input to feature generator 245 to determine the most related concept using the ODP knowledge database as described above. Optionally, concepts provided by feature generator 245 using an encyclopedia can then be further enhanced with the sub-ordinate or super-ordinate concepts of the ODP knowledge database that the encyclopedia concept mapped to, based on the hierarchical structure of the ODP as explained above.

In an exemplary embodiment of the invention, the methods described above can also be used to compute semantic relatedness of two or more texts. Optionally, each text can use any of the feature generators as described above (e.g. using ODP or using Wikipedia) to produce a vector with all the weighted concepts (i.e. not limiting the vector to the most related concepts). Optionally, by comparing the vectors to determine the distance between them, for example using standard metric methods (e.g. cosine, correlation), the similarity of the texts can be determined.

In an exemplary embodiment of the invention, the concepts of the Internet encyclopedia are referenced by hyperlinks from multiple articles of the encyclopedia. In some cases the name given to the hyperlink may differ from article to article, for example an article about the United States may be referenced as "United States", United States of America", "U.S.", "U.S. of A" and other variations. Optionally, the variations in the names of the hyperlinks are used to provide synonymous names for the concepts, for example by adding the synonymous names to the elected list of concepts.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A method of providing weighted concepts related to a sequence of one or more words, comprising:
providing on a computer an encyclopedia with concepts and a document explaining each concept;
wherein each document is made up of one or more words;
forming a vector, for each word in the encyclopedia, which contains the frequency of the word for each concept;
wherein said frequency is the number of times the word appears in the document that explains the concept;
arranging each vector according to the magnitude of the frequency of appearance of the word for each concept;
selecting the concepts with the highest frequencies for each word from its representative vector;
truncating the rest of the vector;
inducing a feature generator using the truncated vectors;
wherein said feature generator is adapted to receive as input one or more words and provide a list of weighted concepts, which are most related to the one or more words provided as input;
wherein said documents include links to other documents of the encyclopedia, and the links point to a body of text.

2. A method according to claim 1, wherein said selecting selects the concepts with the highest frequencies which are higher by a pre-selected percentage than any other frequency in the vector.

3. A method according to claim 2, wherein said pre-selected percentage is greater than 10%.

4. A method according to claim 2, wherein said pre-selected percentage is greater than 20%.

5. A method according to claim 1, wherein said encyclopedia is the Wikipedia encyclopedia.

6. A method according to claim 1, further comprising resolving word sense disambiguation by generating related concepts for various sequences of words from a document.

7. A method according to claim 1, further comprising:
mapping the concepts of the encyclopedia to the concepts of a hierarchical structured knowledge database; and
adding the sub-ordinate or super-ordinate concepts from the hierarchical structured knowledge database for each weighted concept provided by the feature generator.

8. A system for providing weighted concepts related to a sequence of one or more words, comprising:
1) a computer;
2) an encyclopedia with concepts and a document explaining each concept; wherein each document is made up of one or more words;
wherein said documents include links to other documents of the encyclopedia, and the links point to a body of text;
wherein said computer is adapted to form a vector, which contains the frequency of the word for each concept, for each word in the encyclopedia;
wherein said frequency is the number of times the word appears in the document that explains the concept;
arrange each vector according to the magnitude of the frequency of appearance of the word for each concept;
select the concepts with the highest frequencies for each word from its representative vector; truncate the rest of the vector;
induce a feature generator using the truncated vectors; wherein said feature generator is adapted to receive as input one or more words and provide a list of weighted concepts, which are most related to the one or more words provided as input.

* * * * *